March 7, 1933. W. F. WEIR 1,900,086
ENGINE
Filed July 24, 1931 7 Sheets-Sheet 2

W. F. Weir,
INVENTOR
BY Victor J. Evans
and Co. ATTORNEY

March 7, 1933.  W. F. WEIR  1,900,086
ENGINE
Filed July 24, 1931   7 Sheets-Sheet 3

W. F. Weir,
INVENTOR

BY Victor J. Evans
and Co.   ATTORNEY

March 7, 1933.  W. F. WEIR  1,900,086
ENGINE
Filed July 24, 1931  7 Sheets-Sheet 4

W. F. Weir, INVENTOR
BY Victor J. Evans and Co. ATTORNEY

March 7, 1933.  W. F. WEIR  1,900,086
ENGINE
Filed July 24, 1931   7 Sheets-Sheet 5

W. F. Weir,
INVENTOR
BY Victor J. Evans
and Geo.
ATTORNEY

March 7, 1933.   W. F. WEIR   1,900,086
ENGINE
Filed July 24, 1931   7 Sheets-Sheet 6

W. F. Weir,
INVENTOR
BY Victor J. Evans
and Co.
ATTORNEY

Patented Mar. 7, 1933

1,900,086

UNITED STATES PATENT OFFICE

WILLIAM F. WEIR, OF HOLDEN, WEST VIRGINIA, ASSIGNOR TO RALPH THOMPSON AND LAWSON THOMPSON, OF HOLDEN, WEST VIRGINIA

ENGINE

Application filed July 24, 1931. Serial No. 552,960.

This invention relates to an internal combustion engine, the general object of the invention being to provide a plurality of cylinders, with a pair of pistons in each cylinder, forming a central compression and combustion space in each cylinder and a pair of crank shafts, to one of which the pistons at one side of the engine are connected and to the other of which the pistons at the opposite side are connected, with means for so arranging the shafts and the pistons that one piston in each cylinder will be slightly beyond dead center when the charge is ignited and the other piston will be on dead center, whereby one piston will compensate for loss of power and inefficiency of the other, and the charge will be compressed to the maximum degree and the full force of the ignited gases utilized to operate the engine.

Other objects of the invention are economy of construction, light weight, low maintenance cost, accessibility of the parts for repairing, cleaning, etc., and a simple cooling system, which can be removed when desired.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

In these drawings, the numeral 1 indicates a bed plate which is formed with the openings 2, leaving the longitudinally extending part 3 at the center. A crank case 4 is formed at each side of the bed plate, which is divided into sections by the partitions 5, the ends of the case and the partitions having the bearings 6 for the crank shaft 7, one of which is arranged in each case. Bridge pieces 8 may be placed in each section and these pieces also carry the bearings 6' for the shaft. By having the cases divided into sections, there is no danger of the oil in the case running to one end thereof when the engine is placed in an inclined position, and thus causing damage to the parts by improper lubrication. The inner walls of the crank cases are formed with semi-circular openings to receive the ends of the cylinders 9, which are held to the cases by the clamps 10. The sectional cover 11 of each crank case is also provided with semi-circular portions 12 in its inner side to fit over the ends of the cylinders, each cover being bolted to its case with a gasket between the cover and case, and each cover is formed with partitions 13 which are in alignment with the partitions 5 of the crank case and the edges of the partitions in the cover fit in grooves 14 formed in the upper edges of the partitions in the crank case. Suitable packing material is placed in the grooves to form an oil-tight joint between the parts.

The center of each cylinder is supported from the central part 3 of the bed plate by the upright or dowel 15 which engages a socket formed in the under part of the cylinder. A key 16 is formed at each end of each cylinder, on the under part thereof, and these keys engage notches or keyways 17 formed in the inner walls of the crank cases. This manner of supporting the cylinders permits the cylinders to expand and contract. The central exterior part of each cylinder is enlarged and the enlargement is of rectangular shape, as shown at 18. The inlet and exhaust ports 19 are arranged in the sides of this rectangular part and the hole for the spark plug 20 is placed in the top of the enlargement. The socket for the dowel pin is placed in the bottom of the enlargement.

A pair of pistons 21 is placed in each cylinder and these pistons are connected with the crank shafts 7 by the rods 22. I prefer to bevel the ends of each cylinder so that the pistons can be readily inserted therein.

Figure 5:
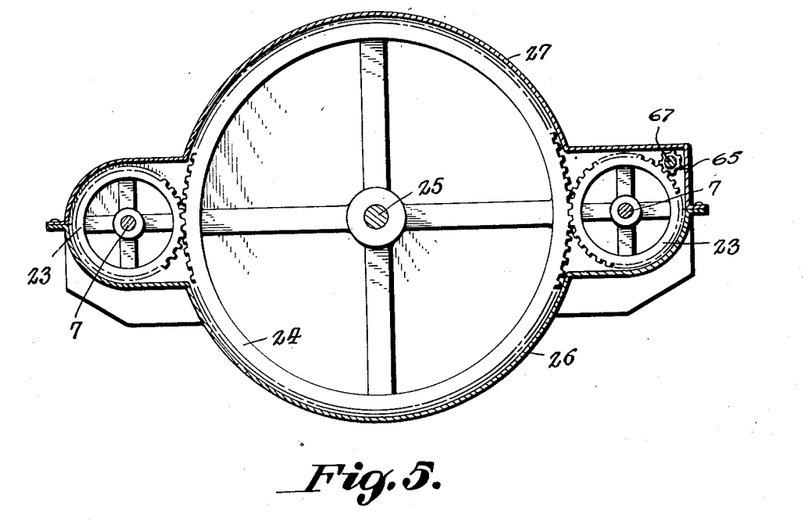
Figure 5 is a section on line 5—5 of Figure 1.
Figure 6:
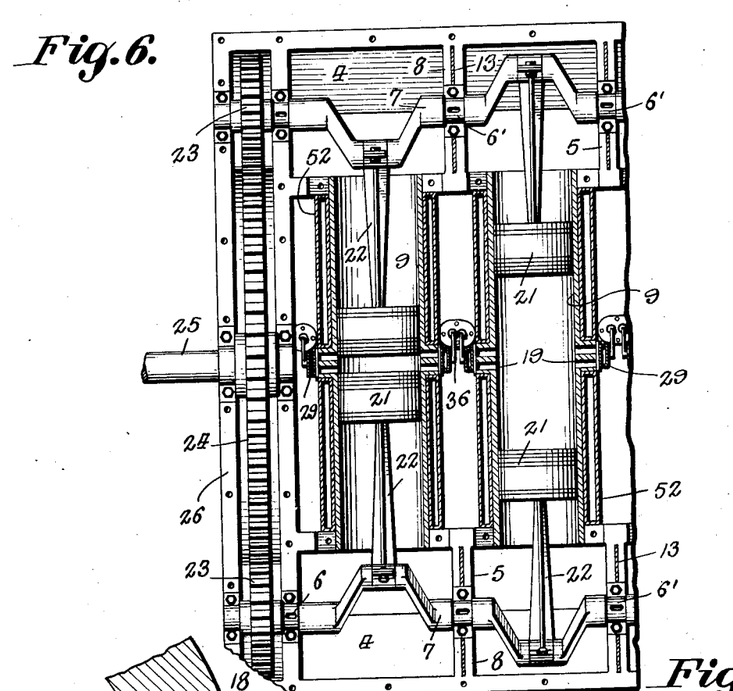
Figure 6 is a section on line 6—6 of Figure 3.
Figure 7:
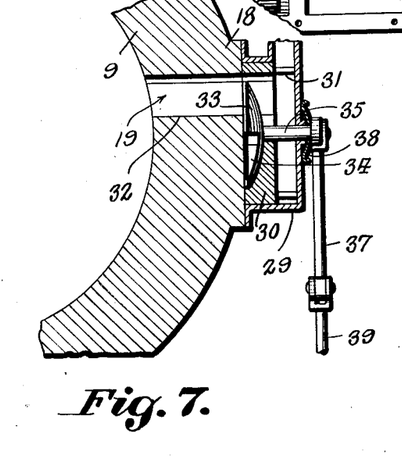
Figure 7 is a detail sectional view of one of the valve arrangements.
Figure 8:
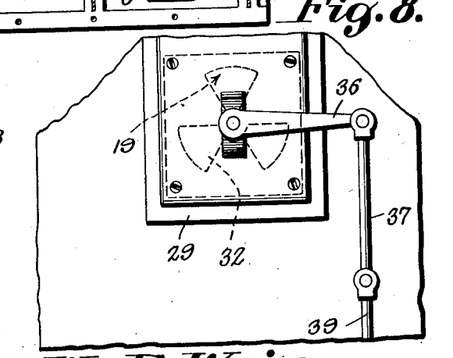
Figure 8 is a front view of Figure 7.
Figure 9:
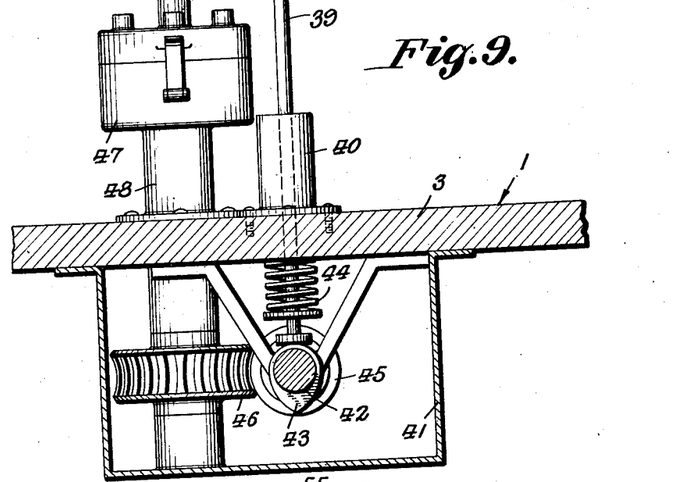
Figure 9 is a detail sectional view showing the timer and one of the tappets, with the means for operating these parts from the cam shaft.

A gear 23 is connected with one end of each crank shaft and a large gear 24 is arranged between the two gears and meshes therewith, this large gear being connected with a shaft 25 which is journaled in one end of the bed plate and in a housing 26 in which the gears are located and which is formed with or connected to one end of the bed plate and has a cover part 27. A conventional starter 28 is supported from the housing and has a pinion 65 (Fig. 5) on its shaft 67 which meshes with one of the gears 23. Thus the motion of the crank shafts is imparted to the large gear and its shaft by the gears 23 and this large gear acts to hold the crank shafts in their adjusted positions.

Figure 1:
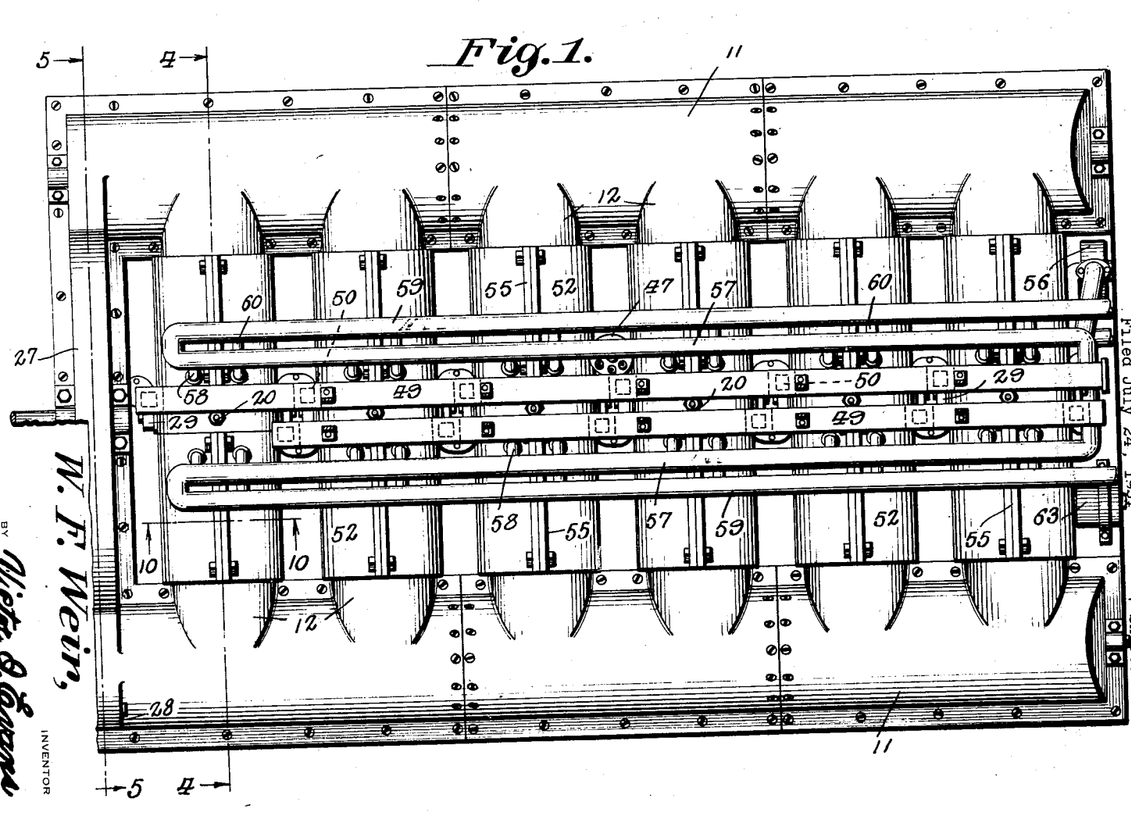
Figure 1 is a top plan view of the invention.
Figure 2:
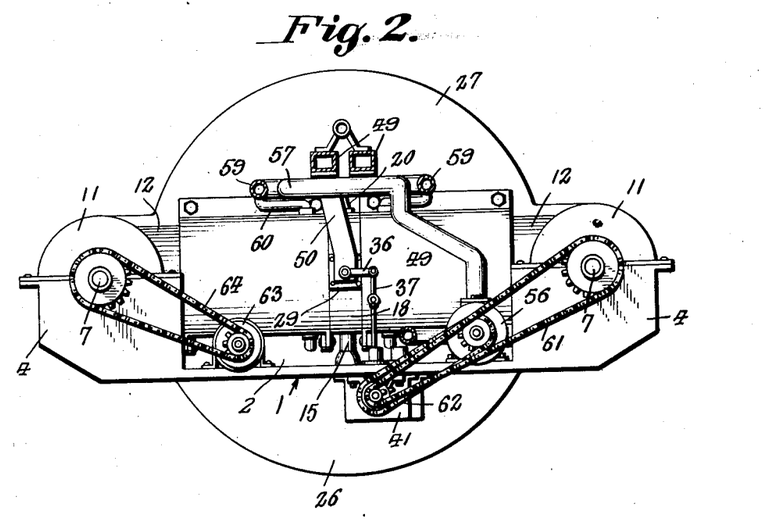
Figure 2 is an end view thereof partly in section.
Figure 3:
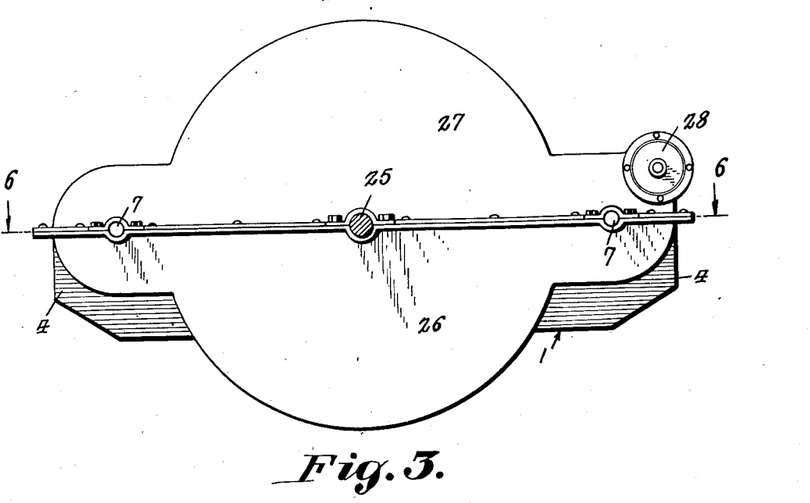
Figure 3 is a view of the opposite end.
Figure 4:
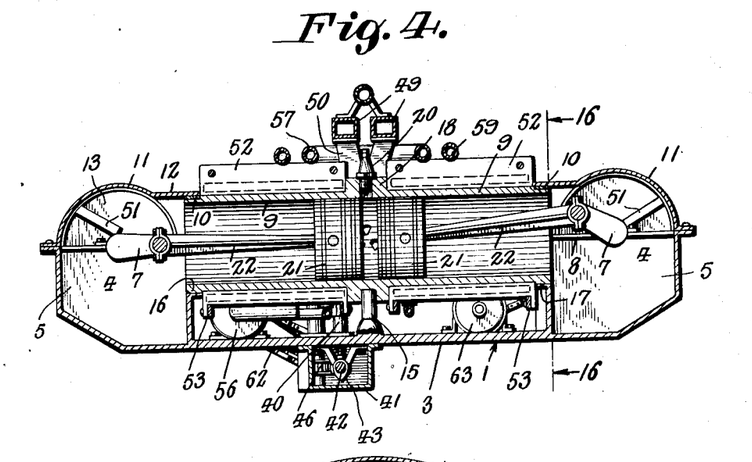
Figure 4 is a section on line 4—4 of Figure 1.

A valve housing 29 is detachably connected to each side of the enlarged part 18 of each cylinder and covers the ported part thereof and a valve seat 30 is detachably arranged in each housing and is held in spaced relation to the outer part thereof by the ledges 31 formed in the housing. This seat is formed with a number of radially arranged and substantially triangular shaped ports 32 which open out into a concaved recess formed in the inner face of the seat and a valve 33 has a convex face fitting in the recess. The valve is formed with the openings 34 which correspond with the ports 32 and the stem 35 of the valve passes through the seat and the housing and has an arm 36 connected with its outer end to which the link or stem 37 is pivoted. A spring 38 is placed on the outer end of the valve stem 35 and acts to hold the valve tightly to its seat. A tappet rod 39 is pivoted to the link in a detachable manner and this rod passes through the guide 40 bolted to the bed plate and through the bed plate into the cam shaft housing 41 attached to the central part 3 of the bed plate. The cam shaft is shown at 42, with its cams 43 engaging the enlarged ends of the tappet rods. A spring 44 on each tappet rod holds the rod against the cam. This cam shaft has a worm 45 thereon which engages a worm gear 46 on the shaft of the timer 47, the bearing part 48 of which is also bolted to the bed plate so that the timer can readily be removed. As shown in Figure 1, this timer is arranged between two of the cylinders, so that it can be easily reached without disturbing other parts of the engine.

As will be seen, the rotary motion of the cam shaft imparts a rocking movement to the valves through the connections shown, and by detaching the link from the tappet rod, the valve parts can be easily removed and the tappet rod and its associated parts can also be removed by removing the guide 40 from the bed plate.

The rocking movements of the valves control the inlet and outlet ports of the cylinders and due to the peculiar construction and arrangement of the parts, there is no necessity to grind the valves as they will wear themselves to a perfect fit, and there will be no adjustment of the valves after they have been installed, since the tappet rods are held in contact with the cam shaft by the springs. Both the valve seat and the housing have projections thereon which form bearings for the valve stem.

The inlet and exhaust manifolds 49 are arranged over the cylinders and have depending parts 50 which are bolted to the central enlargements 18 of the cylinders and are in communication with the housings of the valves, so that the mixture can pass from the inlet manifold to the inlet valves and the exhaust can pass from the exhaust valves to the exhaust manifold. These manifolds are so arranged that the valve covers or housings can be removed without interfering with them. The manifolds are also interchangeable.

It will, of course, be understood that oil is placed in both crank cases and in the cam shaft housing as well as the gear housing. The oil is distributed by splash and gravity and no pump is necessary. The splashing of the oil by the cranks lubricates the pistons, the bearings and the piston pins and troughs 51 are placed at the ends of the crank case covers and on the partitions in the covers for directing oil to the main bearings of the crank shafts. The lower ends of the tappet rods will carry oil from the cam shaft housing to the guides and bearings in which the tappet rods work.

Figure 10:
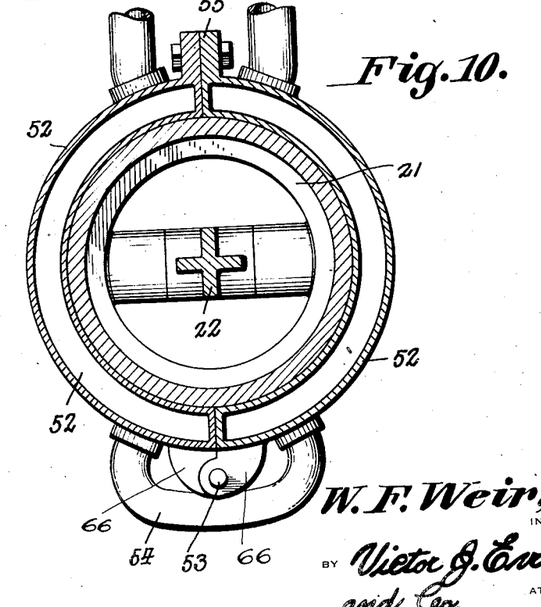
Figure 10 is a section on line 10—10 of Figure 1.
Figure 11:
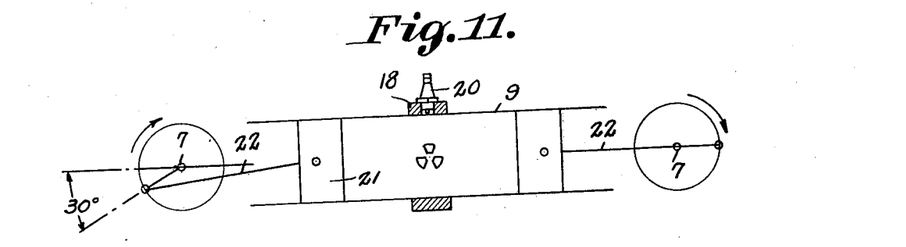
Figures 11, 12, 13 and 14 are diagrammatic views showing the relative positions of the pistons and cranks during the operation of the engine.
Figure 12:
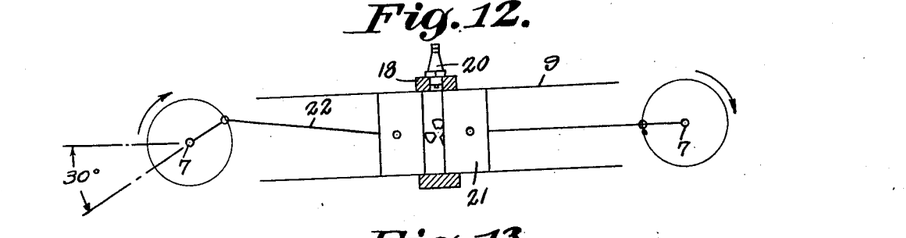
Figure 13:
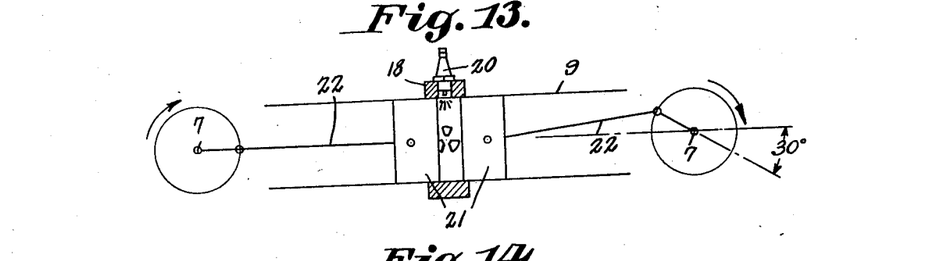
Figure 14:
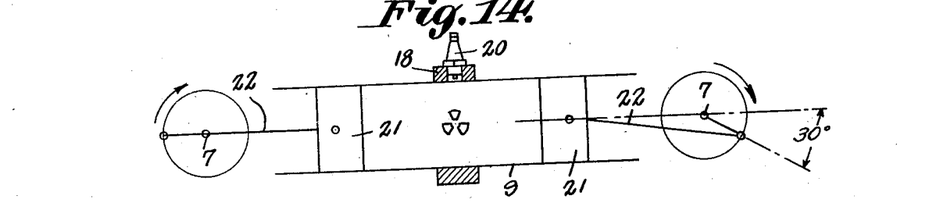
Figures 15, 16:
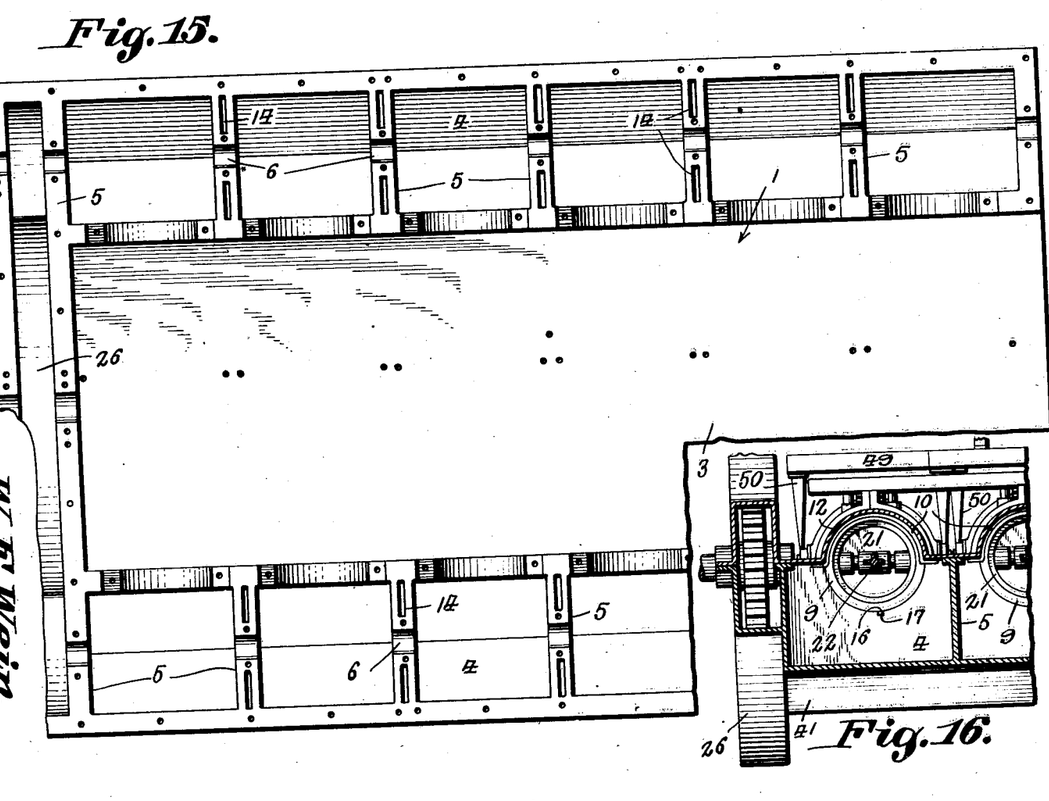
Figure 15 is a view of the bed plate.
Figure 16 is a section on line 16—16 of Figure 4.

The water jacket 52 for each cylinder is made in two sections which have portions 66 that are hinged together at the bottom side of each cylinder by a stud 53 (Fig. 10) passed through apertures in the portions 66, and a hose or pipe 54 connects the two sections together. The two sections are bolted together at their upper edges, which are provided with flanges, as shown at 55. A pair of jackets is used for each cylinder, each jacket extending from the enlargement 18 to the point where the cylinder enters the crank case. As will be seen, the jackets are removable so that they may be removed when the engine is being used in cold weather, as the cylinders will be cooled to a great extent by the air passing through the openings in the bed plate.

The water is circulated by the pump 56 through the pipes 57 and their branches 58 to the upper portions of the jackets and after passing through the jackets, the water passes into the outlet pipes 59 through the branches 60. The branches are so arranged that the water enters each jacket at the top of the inner end thereof, where the heat is the greatest, and then flows through the circular jacket and escapes through the outlet branch which is connected with the other side of the jacket at the top thereof.

The cam shaft is driven from one of the crank shafts by the chain and sprockets 61 and the pump is driven from the cam shaft by the chain and sprockets 62. The generator 63 is driven from the other crank shaft by the chain and sprockets 64.

As shown in the diagrammatic views, the pistons are so connected with the crank shafts that when one piston is on dead center at either end of its stroke, the other piston is a slight distance from dead center, leading the first-named piston by an angle of thirty degrees and does not reach dead center until the first piston has moved a slight distance over dead center. Thus the full force of the explosion comes on the first piston after it has passed dead center where the resistance will be the least and where the force of the explosion will be most effective. As the crank shafts are geared together, the movement of the first piston and its crank shaft will cause the other piston to move beyond dead center so that this piston also receives the force of the explosion at the most effective point. Thus wasted energy or inefficiency, due to the piston being on dead center when the explosion occurs, is eliminated, and the one piston acts as compensating means for the other. The maximum compression of the charge has been retained by this arrangement of the pistons for the point of greatest compression simply shifts to a point where the charge is fired. As before stated, the large gear 24 locks the crank shafts and the pistons in the position in which they are adjusted when the parts are first assembled and this gear also acts as the means for transmitting the power to a driven shaft.

By virtue of the leading stroke arrangement and the resulting period of time that takes place, from the time compression is completed, retained, and shifted to the position most desired, it is obvious that a range of spark position is unnecessary to obtain the greatest results, at any engine speed, also eliminating the possibility of a back-fire.

If so desired, and by using a range of spark position, the engine may be reversed and will operate as efficiently as otherwise, thereby eliminating the need of reverse gears, and the shifting of the same, if used as motive power in an automobile, or if by advancing the spark slightly while the engine is idling, and the automobile is descending a grade, it will produce a retarding effect on the momentum of the car, and may be used in place of the foot brakes.

If used in an airplane, this reversing feature is most valuable, since by reversing the propellers, safe landings could be effected on very short runways, without the danger of nosing over or losing control of direction by sliding, or skidding of the wheels, where wheel brakes are used.

By the double acting pistons within the one cylinder, with strokes of 3½ inches each, an equal amount of gases may be drawn into the cylinder on the suction stroke, also compressed and fired without loss of energy, due to late firing, loss of compression, or overcoming the center line of firing, as compared with other engines with 6 inch strokes and similar bore, also at half the speed, since by the diverging movement on the suction stroke and the converging movement on the compression stroke, the same results are obtained at half speed, as compared with a single acting cylinder.

The compensative stroke engine has increased power, due to an equally high compression, none of which is sacrificed, and which is retained, also shifted without loss to a position in the cylinder to correspond with a position on the crank shaft where it can produce the greatest amount of rotating effort, with any given power impulse and with consequent flexibility.

The compensative stroke engine produces a power stroke that is longer and more lasting, due to the higher compression, and the same becoming forceful where none of its energy is spent on the centerline through the piston, the wrist, and the crank shaft bearing, or at a point so near the same that any of its force is retarded, except in a rotating effort produced by the crank shaft which is in a position that offers the least possible resistance. This will permit also a lower R. P. M. of the engine speed, but the additional power can be utilized by any desired ratio of the gears, and the parts operated by the engine rotated at any desired speed.

The engine has the following advantages, in addition to the compensating stroke feature:—

Economy of construction is a distinct feature, and equally worthy of consideration. The lines for the moulded part are all plain, which can be easily moulded. By virtue of the design, the minimum amount of material can be used. Therefore, unusual lightness is also a result. There will be an approximate saving in weight of 40% and at the same time, an increase in power, due to the compensating stroke.

Low cost of maintenance, due to practical design and simplicity of parts used. The engine is appealing to the prospective buyer, since by the assembly of parts, all of which are on a plane and visible surface, except the cam shaft, it does not offer a perplexing aspect. Understanding of its operation is grasped by the most inexperienced person at a glance.

*Accessibility.*—Piston rings can be changed by raising a section of the crank case cover, and by loosening the wrist bearing, without having to drain the oil from the crank case or going under the car. Carbon can be removed from the cylinders; valves changed or inspected, by removing the valve cover and loosening the coupling on the tappet rods. It is unnecessary to even interfere with the valve spring. A cylinder as a whole can be removed and replaced by disconnecting one wrist bearing, the coupling on the tappet rod, removing the clamps at each end of the cylinder and the manifold connections. If the water system is used, the top hose connection on one end and the two bolts in the flanges on top of each water jacket would also have to be loosened. Interference with other parts not mentioned is unnecessary. Any wrist or crank shaft bearing can be removed or repaired by simply raising the crank case cover. As a whole, any part of the engine can be repaired or removed without interfering with or having to remove another part not desired. Even the manifold connections can be exchanged by themselves alone.

Should a water jacket spring a leak, the same can be shortcircuited for the time being by disconnecting the short hose from the water jackets and connecting the same together, since all intake hose connections to the water jackets are male connections, while all return hose from the water jackets have female fittings.

The water system can be abandoned during the winter season, or in temperatures around 40° or less, and the jackets removed by loosening the hose fittings and the bolts. This also can be accomplished without interference to undesired parts.

As the cylinders are retained by their ends only, except the dowel pins at the center underneath, they are subject and sensitive to the atmosphere surrounding them, and if used in airplanes where high velocities are maintained, nothing more than the air is necessary to cool them.

Should the width of this engine be objectional, for any reason, the inverted V design can be employed without detracting in the least from any one of the features previously described.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In an internal combustion engine, a base having a crank case at each side thereof, a cylinder having its ends communicating with the cases, clamps for holding the ends of the cylinder in the cases, a key at each end of the cylinder engaging a keyway in each case, a dowel on the case engaging a socket on the under side of the cylinder at the center thereof, inlet and exhaust means and ignition means at the center of the cylinder, a crank shaft in each case, a pair of pistons in the cylinder and means for so connecting the pistons with the crank shafts that one piston will be on dead center while the other is beyond center.

2. In an internal combustion engine, a base having a crank case at each side thereof, a crank shaft in each case, a cylinder having its ends in communication with the cases, means for supporting the center of the cylinder from the base, a pair of pistons in the cylinder, a rod connecting each piston with each shaft inlet and exhaust means at the center of the cylinder, ignition means at the center of the cylinder, a sectional water jacket removably attached to the cylinder, said sections of the jacket being of semi-cylindrical shape and hingedly connected together at their lower ends and bolts connecting their upper ends together.

3. In an internal combustion engine, a cylinder, a crank case at each end of and in communication with the cylinder, each of said crank cases having a keyway formed therein, a pair of pistons in the cylinder, keys at the ends of the cylinder disposed in said keyways, a pair of pistons in the cylinder, a crank shaft in each case, and means operatively connecting the pistons to the crank shafts.

4. In an internal combustion engine, a cylinder having a socket at the midportion in its external wall, a base, a crank case at each end of and in communication with the cylinder, a crank shaft in each case, a pair of pistons in the cylinder, means operatively connecting the crank shafts to the pistons, and a dowel on the base engaged in the socket.

5. In an internal combustion engine, a cylinder, a crank case at each end of and in communication with the cylinder, a crank shaft in each case, a pair of pistons in the cylinder, means operatively connecting the pistons to the crank shafts, a sectional water jacket removably attached to the cylinder, said jacket consisting of substantially semi-cylindrical sections hingedly connected together at one end having their other ends separably attached to each other.

In testimony whereof I affix my signature.

WILLIAM F. WEIR.